(12) United States Patent
Kirby

(10) Patent No.: US 11,060,353 B2
(45) Date of Patent: Jul. 13, 2021

(54) COUPLING MECHANISM FOR USE WITH A ROLLER TUBE OF A WINDOW TREATMENT

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 415 days.

(21) Appl. No.: 15/380,971

(22) Filed: Dec. 15, 2016

(65) Prior Publication Data
US 2018/0171710 A1    Jun. 21, 2018

(51) Int. Cl.
| | |
|---|---|
| *E06B 9/42* | (2006.01) |
| *E06B 9/72* | (2006.01) |
| *F16D 1/08* | (2006.01) |
| *E06B 9/44* | (2006.01) |
| *E06B 9/60* | (2006.01) |
| *E06B 9/50* | (2006.01) |

(52) U.S. Cl.
CPC .................. *E06B 9/72* (2013.01); *E06B 9/42* (2013.01); *E06B 9/44* (2013.01); *F16D 1/087* (2013.01); *E06B 9/50* (2013.01); *E06B 9/60* (2013.01)

(58) Field of Classification Search
CPC ..... E06B 9/40; E06B 9/42; E06B 9/44; E06B 9/50; E06B 9/60; Y10T 403/7039; Y10T 403/7047; Y10T 403/7049; Y10T 403/7051; Y10T 403/7061
See application file for complete search history.

(56) References Cited

U.S. PATENT DOCUMENTS

| | | | |
|---|---|---|---|
| 3,802,222 A | 4/1974 | Weber | |
| 4,130,191 A | 12/1978 | Judd et al. | |
| 5,445,255 A | 8/1995 | Rutke et al. | |
| 6,059,084 A | 5/2000 | Still | |
| 6,497,267 B1 | 12/2002 | Azar et al. | |
| 6,902,046 B1 | 6/2005 | Dumas | |
| 6,902,141 B2 | 6/2005 | Kirby | |
| 6,983,783 B2 | 1/2006 | Carmen, Jr. et al. | |
| 7,240,716 B2 | 7/2007 | Nichols, Jr. et al. | |

(Continued)

FOREIGN PATENT DOCUMENTS

| | | |
|---|---|---|
| CN | 101454232 A | 6/2009 |
| CN | 103154416 A | 6/2013 |

(Continued)

*Primary Examiner* — Daniel P Cahn
*Assistant Examiner* — Jeremy C Ramsey
(74) *Attorney, Agent, or Firm* — Condo Roccia Koptiw LLP

(57) ABSTRACT

A coupling for a roller tube of a window treatment system may include a body and/or one or more compliant members. The body may include a bore through a rotational axis of the coupling. The body may be configured to be received within the roller tube of the window treatment system. The body may define an outer surface. One or more compliant members may extend at an oblique angle from the outer surface of the coupling. The one or more compliant members may be configured to engage a smooth inner surface of the roller tube. The use of compliant members may enable a rigid connection of the coupling to the smooth inner surface of the roller tube surface, without the use of fasteners.

24 Claims, 10 Drawing Sheets

(56) References Cited

U.S. PATENT DOCUMENTS

| | | | |
|---|---|---|---|
| 7,484,606 B2 | 2/2009 | Muramatsu et al. | |
| 7,506,738 B2 | 3/2009 | Muramatsu et al. | |
| 7,677,293 B2 * | 3/2010 | Allsopp | E06B 9/50 |
| | | | 160/321 |
| 7,839,109 B2 | 11/2010 | Carmen, Jr. et al. | |
| 8,561,772 B2 | 10/2013 | Papania et al. | |
| 8,651,166 B1 * | 2/2014 | Daniels | E06B 9/44 |
| | | | 160/238 |
| 8,950,461 B2 | 2/2015 | Adams et al. | |
| 2010/0116443 A1 * | 5/2010 | Berman | E06B 9/17007 |
| | | | 160/242 |
| 2010/0175838 A1 | 7/2010 | Faller et al. | |
| 2010/0230250 A1 | 9/2010 | Lindemann | |
| 2010/0252211 A1 * | 10/2010 | Barnes | E06B 9/50 |
| | | | 160/120 |
| 2012/0090795 A1 | 4/2012 | Kirby | |
| 2013/0153162 A1 | 6/2013 | Blair et al. | |
| 2014/0224437 A1 * | 8/2014 | Colson | E06B 9/42 |
| | | | 160/291 |
| 2014/0305602 A1 | 10/2014 | Kirby et al. | |
| 2015/0075732 A1 * | 3/2015 | Kirby | E06B 9/72 |
| | | | 160/310 |
| 2016/0298388 A1 * | 10/2016 | Tao | E06B 9/50 |
| 2016/0326801 A1 | 11/2016 | Blair et al. | |
| 2016/0369558 A1 | 12/2016 | Kirby | |
| 2017/0175819 A1 | 6/2017 | Ng | |
| 2019/0085628 A1 | 3/2019 | Bohlen et al. | |

FOREIGN PATENT DOCUMENTS

| | | |
|---|---|---|
| CN | 203383711 U | 1/2014 |
| CN | 105089482 A | 11/2015 |
| CN | 204920750 U | 12/2015 |
| FR | 2198580 A5 | 3/1974 |
| GB | 1568683 A | 6/1980 |
| JP | S5551111 A | 4/1980 |

* cited by examiner

COUPLING MECHANISM FOR USE WITH A ROLLER TUBE OF A WINDOW TREATMENT

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

Advances in window construction technology have enabled the manufacture of windows in ever increasing sizes, such as windows that may be eight or more feet wide. Such large windows may require similarly large window treatments. For example, a roller shade configured to cover such a wide window may require an unusually long roller tube.

Traditionally, roller tubes are made of metal. Roller tubes may be made from other materials. For example, a roller tube may be made from a composite material, such as carbon fiber. An inner surface of the roller tube of a roller shade may include splines configured to interface with a drive assembly such that the roller tube can be driven by the drive assembly. Alternatively, the inner surface of a composite roller tube may be smooth (i.e., without splines). A roller tube with a smooth inner surface may reduce manufacturing complexity. But, the drive assembly components may be configured to be splined into the inner surface of the roller tube. And, the drive assembly components may not be capable of rotating a roller tube with a smooth inner surface.

SUMMARY

As described herein, a coupling assembly may be configured for use with a window treatment, such as a motorized window treatment that includes a covering material attached to a roller tube. The coupling assembly may be driven by a drive assembly of the motorized window treatment. The coupling assembly may operatively engage the roller tube of the motorized window treatment, such that rotation of the coupling assembly causes the roller tube to rotate and move a covering material of the motorized window treatment between a first position (e.g., an open position) and a second position (e.g., a closed position).

The coupling assembly may be received within the roller tube. The coupling assembly may include a plurality of compliant members. The plurality of compliant members may protrude from an outer surface of the coupling assembly. The distal ends of the plurality of compliant members may define tips that are configured to abut the inner surface of the roller tube. The tips of the compliant members may apply a compressive force to the inner surface of the roller tube such that relative rotation of the coupling assembly with respect to the roller tube is prevented. The use of compliant members may enable a rigid (e.g., non-clutch) connection of the coupling assembly to a smooth roller tube surface, without the use of fasteners.

The plurality of compliant members of the coupling assembly may be u-shaped spring clips. The spring clips may define a base and one or more compliant members that extends from the base. The spring clips may include two compliant members that extend inwardly from the base at opposed oblique angles. For example, the oblique angles may be supplementary. The coupling assembly may define a plurality of cavities that are configured to accept the spring clips. The coupling assembly may include a plurality of spring clip retainers and/or one or more retaining tabs that are configured to retain the plurality of spring clips within their respective cavities.

DETAILED DESCRIPTION

Figure 1A:
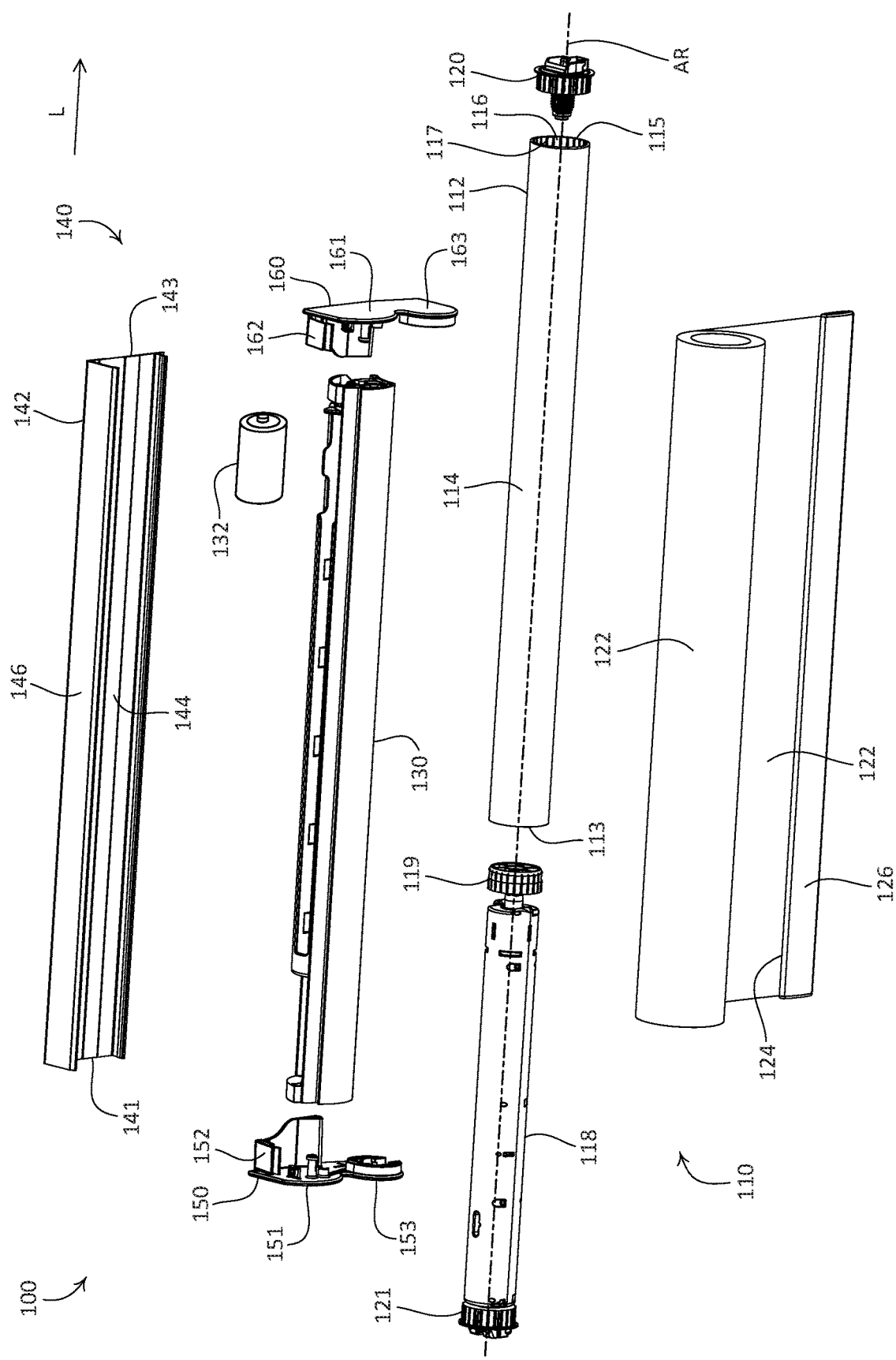
FIG. 1A is an exploded view of an example battery-powered roller shade for use in an oversized opening, the battery-powered roller shade including an example low-deflection roller tube.
Figure 1B:
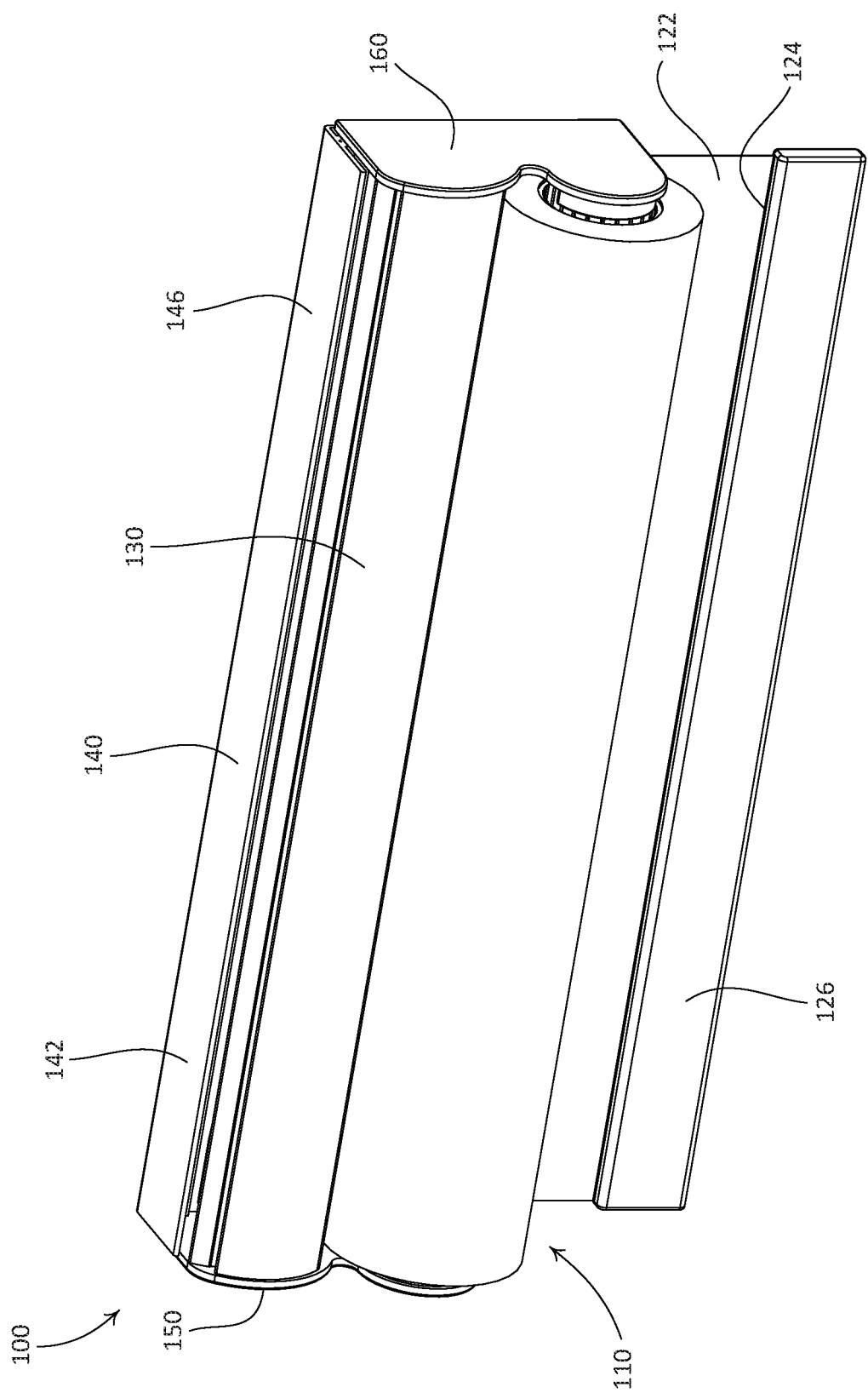
FIG. 1B is a perspective view of the example battery-powered roller shade depicted in FIG. 1A, with the shade in a raised position.
Figure 1C:
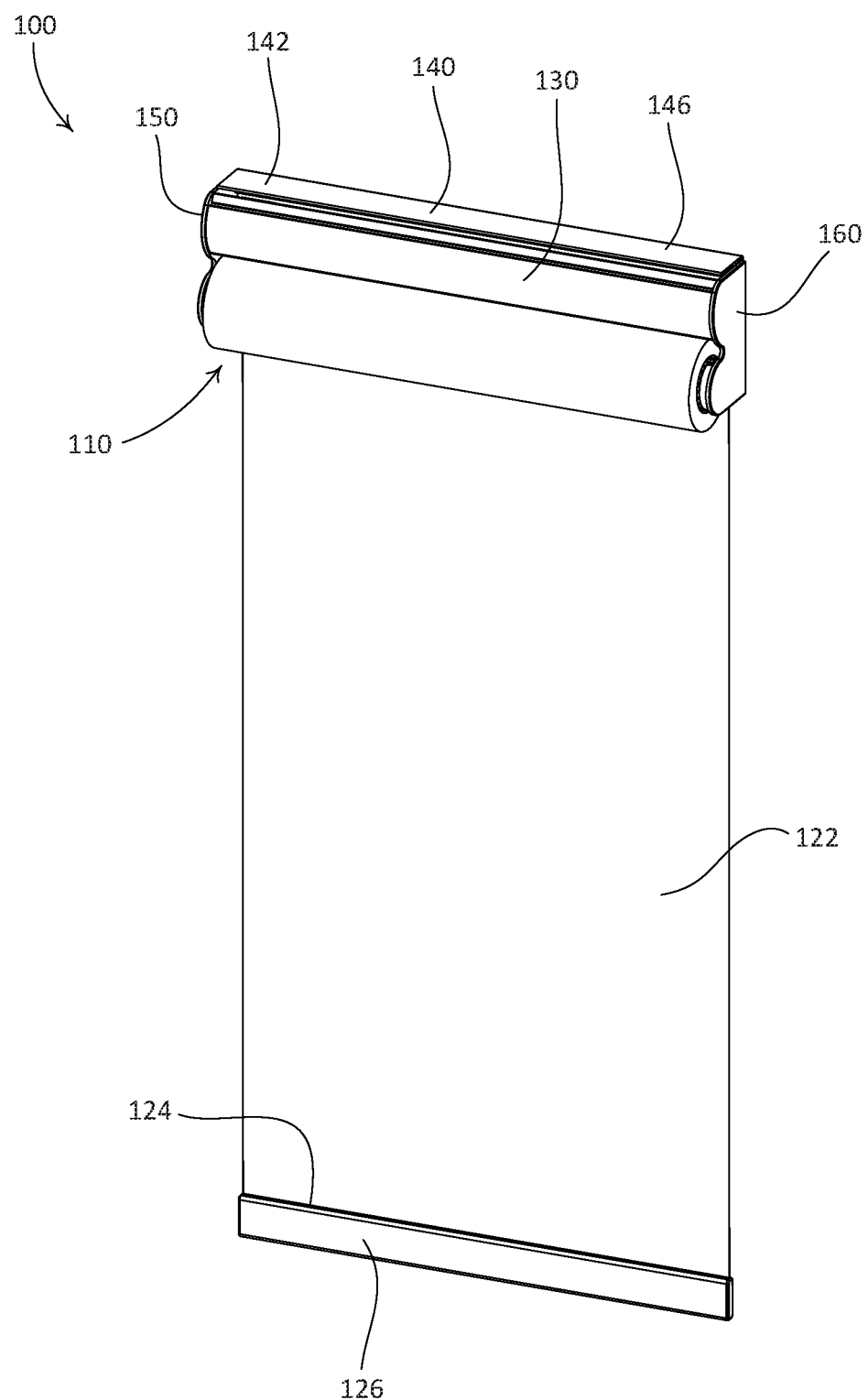
FIG. 1C is a perspective view of the example battery-powered roller shade depicted in FIG. 1A, with the shade in a lowered position.

FIGS. 1A-1C depict an example window treatment, in the form of a motorized roller shade 100, that may be mounted in front of a large opening, such as one or more windows that span eight feet or more in width, to prevent sunlight from entering a space and/or to provide privacy. The motorized roller shade 100 may be mounted to a structure that is proximate to the opening, such as a window frame, a wall, or other structure. As shown, the motorized roller shade 100 includes a shade assembly 110, a battery compartment 130, and a housing 140 that may be configured to support the shade assembly 110 and the battery compartment 130. The housing 140 may be configured as a mounting structure and/or a support structure for one or more components of the motorized roller shade 100.

As shown, the housing 140 includes a rail 142, a first housing bracket 150, and a second housing bracket 160. The illustrated rail 142 is elongate between a first end 141 and an opposed second end 143. The rail 142, the first housing bracket 150, and the second housing bracket 160 may be configured to attach to one another in an assembled configuration. For example, the first housing bracket 150 may be configured to be attached to the first end 141 of the rail 142, and the second housing bracket 160 may be configured to be attached to the second end 143 of the rail 142. As shown, the first housing bracket 150 defines an attachment member 152 that is configured to engage the first end 141 of the rail 142, and the second housing bracket 160 defines an attachment member 162 that is configured to engage the second end 143 of the rail 142. It should be appreciated that the rail 142, the first housing bracket 150, and the second housing bracket 160 are not limited to the illustrated attachment members.

One or more of the rail 142, the first housing bracket 150, or the second housing bracket 160, may be sized for mounting to a structure. For example, the rail 142 may be sized such that, with the first and second housing brackets 150, 160 attached to the rail 142, the rail 142 may be mounted to a structure in an opening (e.g., to a window frame). In such an example configuration, the rail 142 may define a length, for example as defined by the first and second ends 141, 143, such that the housing 140 may fit snugly in a window frame (e.g., with little clearance between the first and second housing brackets 150, 160 and adjacent structure of a window frame). This configuration may be referred to as an internal mount configuration. In another example, the rail 142 may be sized such that, with the first and second housing brackets 150, 160 attached to the rail 142, the rail 142 may be mounted to a structure above an opening (e.g., to a surface above a window). In such an example configuration, the rail 142 may define a length that is substantially equal to (e.g., slightly longer than) a width of the window opening. In still another example, one or more of the rail 142, the first housing bracket 150, or the second housing bracket 160 may be sized such that the motorized roller shade 100 may be mounted within a cavity defined by a window treatment pocket that may be mounted to a structure, such as structure surrounding a window. It should be appreciated, however, that the motorized roller shade 100 is not limited to these example mounting configurations.

The rail 142 may define any suitable shape. As shown, the rail 142 includes a rear wall 144 and an upper wall 146 that extends outward from an upper edge of the rear wall 144 along a direction that is substantially perpendicular to the rear wall 144. One or both of the rear wall 144 and the upper wall 146 may be configured to be mounted to a structure. The rail 142, the first housing bracket 150, and the second housing bracket 160, when in an assembled configuration, may define a cavity. The shade assembly 110 and the battery compartment 130 may be disposed in the cavity, for example when the motorized roller shade 100 is in an assembled configuration (e.g., as shown in FIGS. 1B and 1C). When the motorized roller shade 100 is in an assembled configuration, the housing 140 may be open at the front and bottom, such that the shade assembly 110 and the battery compartment 130 are exposed. The motorized roller shade 100 may optionally include a fascia (not shown) that is configured to conceal one or more components of the motorized roller shade 100, such as the battery compartment 130 and portions of the shade assembly 110.

As shown, the shade assembly 110 includes a roller tube 112, a motor drive unit 118, an idler 120, a covering material 122 (e.g., a shade fabric), and a hembar 126. The roller tube 112 may have a tube body 114 that is elongate along a longitudinal direction L from a first end 113 to an opposed second end 115. The tube body 114 may define any shape, such as the illustrated cylindrical shape. As shown, the roller tube 112 is hollow, and open at the first and second ends 113, 115. The roller tube 112 may be configured to at least partially receive the motor drive unit 118, and to at least partially receive the idler 120. As shown, the roller tube 112 is configured such that a portion of the motor drive unit 118 may be disposed in the first end 113, and such that a portion of the idler 120 may be disposed in the second end 115.

The tube body 114 may define an inner surface 116 that is configured to operatively engage with the motor drive unit 118. For example, as shown, the tube body 114 defines a plurality of splines 117 that extend radially inward from the inner surface 116. The roller tube 112 may be configured to operatively engage with the motor drive unit 118 via the plurality of splines 117. For example, the splines 117 may be configured to operatively engage with a component of the motor drive unit 118, such that rotational torque may be transferred to the roller tube 112 from the motor drive unit 118, thereby causing the roller tube 112 to rotate about an axis of rotation AR. The axis of rotation AR of the roller tube 112 may also be referred to as a central axis of the roller tube 112.

As shown, the splines 117 extend parallel to the longitudinal direction L, and are spaced apart from each other equally along a circumference of the inner surface 116 of the roller tube 112. Each of the illustrated splines 117 extends from the first end 113 to the second end 115 of the tube body 114. It should be appreciated that the roller tube 112 is not limited to illustrated configuration and/or geometry of splines 117. It should further be appreciated that the roller tube 112 may be alternatively configured to operably engage with the motor drive unit 118. For example, in accordance with an alternative configuration of the roller tube 112, the tube body 114 may define a smooth inner surface 116, and may define an opening that extends through the tube body 114 at a location such that the roller tube 112 may be operatively coupled to the motor drive unit 118 via one or more fasteners that may be disposed into the opening and that may engage the motor drive unit 118 (e.g., such as screws, pins, clips, or the like).

The illustrated motor drive unit 118 may be configured to be disposed into the first end 113 of the roller tube 112. One or more components of the motor drive unit 118 may be configured to engage with the plurality of splines 117 of the roller tube 112. As shown, the motor drive unit includes a drive hub 119 that defines a plurality of grooves that are configured to operably engage with corresponding ones of the splines 117, such that operation of the motor drive unit 118 may cause the roller tube 112 to rotate. The motor drive unit 118 may further include an integrated idler 121 that defines a plurality of grooves that are configured to engage with corresponding ones of the splines 117. The idler 120 may similarly define a plurality of grooves that are configured to engage with corresponding ones of the splines 117.

The covering material 122 may define an upper end (not shown) that is configured to be operably attached to the roller tube 112, and an opposed lower end 124 that is configured as a free end. Rotation of the roller tube 112 about the axis of rotation AR, for example rotation caused by the motor drive unit 118, may cause the covering material 122 to wind onto, or to unwind from, the roller tube 112. In this regard, the motor drive unit 118 may adjust the covering material 122, for instance between raised and lowered positions of the covering material 122 as shown in FIGS. 1B and 1C, respectively.

Rotation of the roller tube 112 in a first direction about the axis of rotation AR may cause the covering material 122 to unwind from the roller tube 112, for example as the covering material 122 is operated to a lowered position relative to an opening (e.g., a window). FIG. 1C depicts the motorized roller shade 100 with the covering material 122 in a lowered position. Rotation of the roller tube 112 in a second direction, about the axis or rotation AR, that is opposite the first direction may cause the covering material 122 to wind onto the roller tube 112, for example as the covering material 122 is operated to a raised position relative to the opening. FIG. 1B depicts the motorized roller shade 100, with the covering material 122 in a raised position.

The covering material 122 may be made of any suitable material, or combination of materials. For example, the covering material 122 may be made from one or more of "scrim," woven cloth, non-woven material, light-control film, screen, or mesh. The hembar 126 may be attached to the lower end 124 of the covering material 122, and may be weighted, such that the hembar 126 causes the covering material 122 to hang (e.g., vertically) in front of one or more windows.

The motor drive unit 118 may be configured to enable control of the rotation of the roller tube 112, for example by a user of the motorized roller shade 100. For example, a user of the motorized roller shade 100 may control the motor drive unit 118 such that the covering material 122 is moved to a desired position. The motor drive unit 118 may include a sensor that monitors a position of the roller tube 112. This may enable the motor drive unit 118 to track a position of the covering material 122 relative to respective upper and lower limits of the covering material 122. The upper and lower limits may be specified by an operator of the motorized roller shade 100, and may correspond to the raised and lowered positions of the covering material 122, respectively.

The motor drive unit 118 may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled "Motorized Shade Control System," U.S. Pat. No. 7,839,109, issued Nov. 23, 2010, entitled "Method Of Controlling A Motorized Window Treatment," U.S. Pat. No. 8,950,461, issued Jan. 21, 2015, entitled "Motorized Window Treatment," and U.S. Patent Application Publication No. 2013/0153162, published Jun. 20, 2013, entitled "Battery-Powered Motorized Window Treatment Having A Service Position," the entire contents of each of which are incorporated herein by reference. It should be appreciated, however, that any motor drive unit or drive system may be used to control the roller tube 112.

The motorized roller shade 100 may include an antenna (not shown) that is configured to receive wireless signals (e.g., RF signals from a remote control device). The antenna may be in electrical communication with the motor drive unit 118 (e.g., via a control circuit or PCB), such that one or more wireless signals received from a remote control unit may cause the motor drive unit 118 to move the covering material 122 (e.g., between the lowered and raised positions). The antenna may be integrated with (e.g., pass through, be enclosed within, and/or be mounted to) one or more of the shade assembly 110, the battery compartment 130, the housing 140, or respective components thereof.

The battery compartment 130 may be configured to retain one or more batteries 132. The illustrated battery 132 may be, for example, a D cell (e.g., IEC R20) battery. One or more components of the motorized roller shade 100, such as the motor drive unit 118, may be powered by the one or more batteries 132. However, it should be appreciated that the motorized roller shade 100 is not limited to the illustrated battery-powered configuration. For example, the motorized roller shade 100 may be alternatively configured such that one or more components thereof, such as the motor drive unit 118, may be powered by an alternating current (AC) source, a direct current (DC) source, or any combination of power sources.

The battery compartment 130 may be configured to be operable between an opened position and a closed position, such that one or more batteries 132 may be accessible when the battery compartment 130 is in the opened position. Examples of battery compartments for motorized roller shades are described in greater detail in U.S. Patent Application Publication No. 2014/0305602, published Oct. 16, 2014, entitled "Integrated Accessible Battery Compartment For Motorized Window Treatment," the entire contents of which are incorporated herein by reference.

The housing 140 may be configured to support one or both of the shade assembly 110 and the battery compartment 130. For example, the first and second housing brackets 150, 160 may be configured to support the shade assembly 110 and/or the battery compartment 130. As shown, the first and second housing brackets 150, 160 are configured to support the shade assembly 110 and the battery compartment 130 such that the battery compartment 130 is located (e.g., is oriented) above the shade assembly 110 when the motorized roller shade 100 is mounted to a structure. It should be appreciated that the motorized roller shade 100 is not limited to the illustrated orientation of the shade assembly 110 and the battery compartment 130. For example, the housing 140 may be alternatively configured to otherwise support the shade assembly 110 and the battery compartment 130 relative to each other (e.g., such that the battery compartment 130 is located below the shade assembly 110).

As shown, the first housing bracket 150 defines an upper portion 151 and a lower portion 153, and the second housing bracket 160 defines an upper portion 161 and a lower portion 163. The upper portion 151 of the first housing bracket 150 may be configured to support a first end of the battery compartment 130, and the upper portion 161 of the second housing bracket 160 may be configured to support a second end of the battery compartment 130. The upper portions 151, 161 of the first and second housing brackets 150, 160, respectively, may be configured to operably support the support the battery compartment 130, such that the battery compartment 130 is operable to provide access to one or more batteries 132 when the motorized roller shade 100 is mounted to a structure.

The lower portion 153 of the first housing bracket 150 may be configured to support the idler 121, and thus the first end 113 of the tube body 114 of the roller tube 112. The lower portion 163 of the second housing bracket 160 may be configured to support the idler 120, and thus the second end 115 of the tube body 114 of the roller tube 112. The lower portions 153, 163 of the first and second housing brackets 150, 160, respectively, may be configured to operably support the support the shade assembly 110, such that the covering material 122 may be moved (e.g., between the lowered and raised positions). Because the roller tube 112 is supported at the first and second ends 113, 115 of the tube body 114, it may be stated that the shade assembly 110, and thus the roller tube 112, is simply supported by the housing 140.

The housing 140 may be configured to be mounted to a structure using one or more fasteners (e.g., one or more screws). For example, one or more of the rail 142, the first housing bracket 150, or the second housing bracket 160 may define one or more respective apertures that are configured to receive fasteners.

The components of the housing 140 may be made of any suitable material or combination of materials. For example, the rail 142 may be made of metal and the first and second housing brackets 150, 160 may be made of plastic. Although the illustrated housing 140 includes separate components, it should be appreciated that the housing 140 may be otherwise constructed. For example, the rail 142, the first housing bracket 150, and the second housing bracket 160 may be monolithic. In another example, the rail may include first and second rail sections that may be configured to attach to one another. In such an example configuration, the first rail section may include an integrated first housing bracket and the second rail section may include an integrated second housing bracket. One or more components of the housing 140 (e.g., one or more of the rail 142, the first housing bracket 150, or the second housing bracket 160) may be wrapped in a material (e.g., fabric), for instance to enhance the aesthetics of the housing 140.

The motorized roller shade 100 may be configured for use in covering an atypically large opening, such as a window, or cluster of windows, having a width greater than 8 feet, and up to about 15 feet wide, such as about 12 feet wide. In such an application, the roller tube 112 may be susceptible to an amount of tube sag that may negatively impact the aesthetic of the covering material 122 and/or the functionality of the motorized roller shade, such as raising or lowering the covering material 122. One or more components of the motorized roller shade 100 may be configured to mitigate the occurrence of tube sag. For example, the roller tube 112 may be configured as a low-deflection roller tube.

Figure 2:
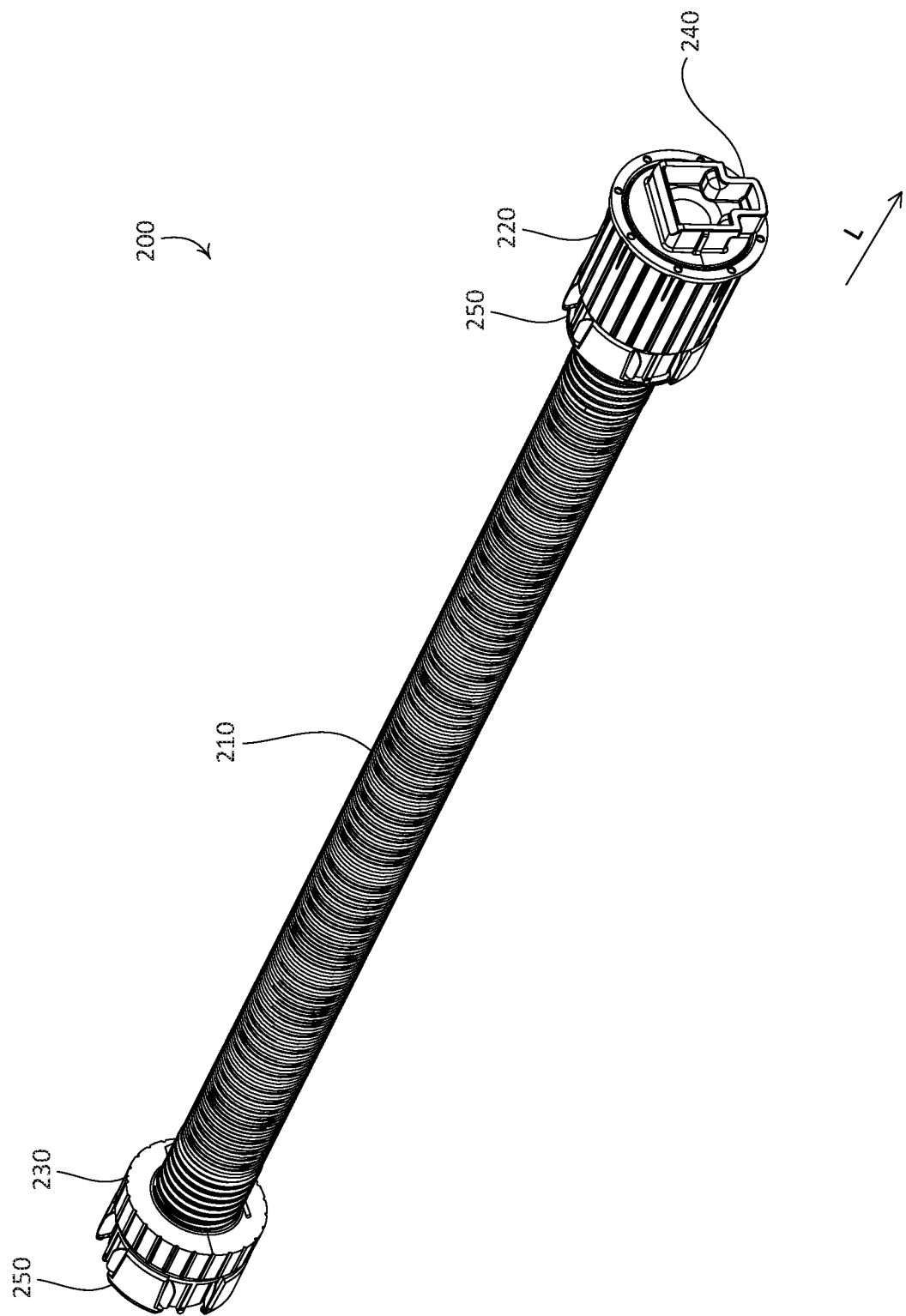
FIG. 2 is a perspective view of an example drive assembly.

FIG. 2 is a perspective view of an example drive assembly 200. The example drive assembly 200 may include a motor drive unit (e.g., such as the motor drive unit 118 depicted in FIG. 1A), a shaft (not shown), a torsion spring 210, a mandrel (not shown), an idler 220 (e.g., such as idlers 120, 121 depicted in FIG. 1A), and/or a drive hub 230 (e.g., such as the drive hub 119 depicted in FIG. 1A). The torsion spring 210 may be wound around the mandrel. For example, the torsion spring 210 may be wound around the mandrel from the idler 220 to the drive hub 230. The distal ends of the torsion spring 210 may be secured to the idler 220 and/or the drive hub 230. A housing of the motor drive unit may be configured to function as the mandrel for the torsion spring 210. The mandrel may define a contact surface that the torsion spring 210 rides on as the drive hub 230 rotates. When the drive hub 230 rotates in a first rotational direction, the torsion spring 210 may apply a first friction force against the mandrel, and when the drive hub 230 rotates in the second rotational direction, the torsion spring 210 may apply a second friction force against the mandrel that is lower in magnitude than the first friction force.

The idler 220 may include a plurality of splines that extend along the longitudinal direction L. The idler 220 may include an attachment member 240. The attachment member 240 may be configured to be removably attached to a housing bracket (not shown). For example, the attachment member 240 may receive the housing bracket. The attachment member 240 and the housing bracket may be configured to support the example drive assembly 200 and/or a roller tube (not shown).

The example drive assembly 200 may be used in a motorized window treatment (e.g., such as the motorized roller shade 100). For example, the example drive assembly 200 may be received by a roller tube of the motorized window treatment (e.g., the roller tube 114 of the motorized roller shade 100). The example drive assembly 200 may operate the motorized window treatment by rotating the roller tube of the motorized window treatment. For example, the example drive assembly 200 may accept one or more couplings 250. The one or more couplings 250 may be configured to engage an inner surface of the roller tube such that the example drive assembly 200 is coupled to the roller tube. The one or more couplings 250 may engage one or more components of the example drive assembly 200.

Figure 3:
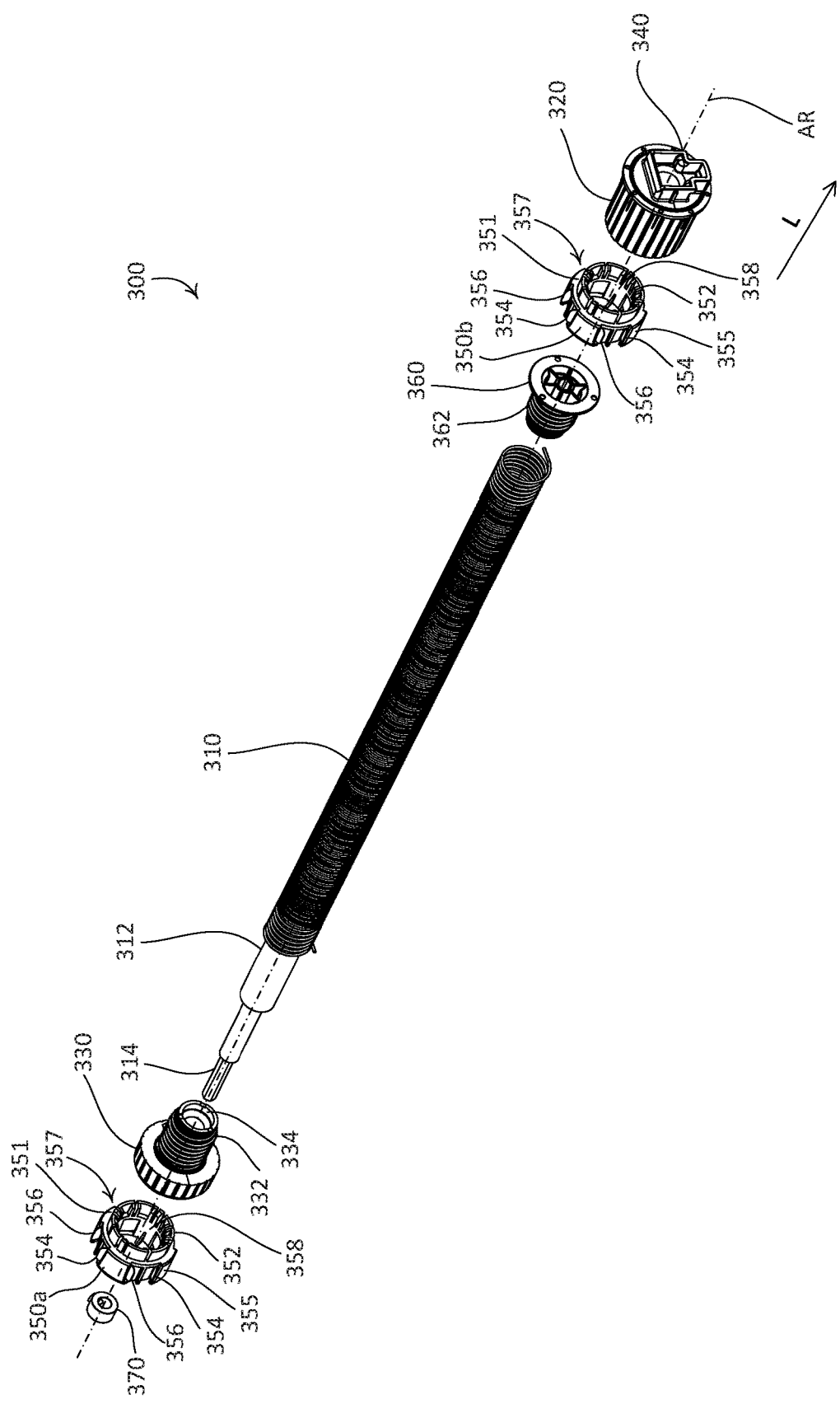
FIG. 3 is an exploded view of an example drive assembly.

FIG. 3 is an exploded view of an example drive assembly 300 (e.g., such as the example drive assembly 200 depicted in FIG. 2). The example drive assembly 300 may include a motor drive unit (e.g., such as the motor drive unit 118 depicted in FIG. 1A), a drive shaft 314, a mandrel 312, a torsion spring 310, an idler 320, a drive hub 330, a coupling 360, and/or a retention collar 370. The torsion spring 310 may be wound around the mandrel 312. The mandrel 312 may receive the drive shaft 314. The drive shaft may engage the idler 320, the drive hub 330 and/or the coupling 360. The example drive assembly 300 may be used in a motorized window treatment. The example drive assembly 300 may include one or more couplings. For example, as shown the drive assembly 300 may include a first coupling 350a and a second coupling 350b. Rotation of the example drive assembly 300 may be transferred to the roller tube of the motorized window treatment via the first and second couplings 350a, 350b. The retention collar 370 may prevent drive assembly components from sliding off the drive shaft 314.

The idler 320 may include a plurality of splines that extend along the longitudinal direction L. The idler 320 may include an attachment member 340. The attachment member 340 may be configured to be removably attached to a housing bracket (e.g., one or both of the housing brackets 150, 160). For example, the attachment member 340 may receive the housing bracket. The attachment member 340 and the housing bracket may be configured to support the example drive assembly 300 and/or the roller tube (e.g., the roller tube 114).

The drive hub 330 may include a threaded portion 332 that extends from a side of the drive hub 330. The threaded portion 332 of the drive hub 330 may include a thread pattern that is configured to accept the torsion spring 310. The drive hub 330 may define a hub cavity 334 that extends around the axis of rotation AR and through the threaded member 332 in the longitudinal direction L. The hub cavity 334 may receive the drive shaft 314 and/or the mandrel 312. The drive hub 330 may be configured to engage one of the couplings 350a, 350b. For example, the drive hub 330 may be operatively coupled to the first coupling 350a.

The coupling 360 may include a threaded portion 362. The threaded portion 362 of the coupling 360 may accept the torsion spring 310. For example, the torsion spring 310 may be wound around the threaded portion 362 of the coupling 360. The threaded portion 362 of the coupling 360 and the threaded portion 332 of the drive hub 330 may retain the ends of the torsion spring 310.

Each coupling 350a and 350b may include a respective body 357. The body 357 may define any suitable shape, such as the illustrated cylindrical body 357. As shown, the body 357 may define a bore 358 that extends therethrough along an axis of rotation AR. The body 357 may define an outer surface 355. Each of the couplings 350a, 350b may be configured to accept the drive shaft 314. For example, either of the couplings 350a, 350b may be configured to accept the drive shaft 314 via the bore 358 through the axis of rotation AR. As shown, the coupling 350a may be configured to engage the drive hub 330, and the coupling 350b may be configured to engage the idler 320. Each of the couplings 350a, 350b may include a respective ring 352 with a plurality of notches. The ring 352 may extend from a first side 351 of the body 357. The ring 352 may have a smaller outer diameter than the outer surface 355 of the coupling. The drive hub 330 may accept the ring 352 such that the drive hub 330 and the coupling 350a are operatively coupled together. The plurality of notches of the ring 352 may engage a plurality of splines of the drive hub 330. The idler 320 may accept the ring 352. The plurality of notches of the ring 352 may engage a plurality of splines of the idler 320.

The drive shaft 314 may be driven by a motor (not shown) of the motor drive unit. The drive shaft 314 may rotate about the axis of rotation AR. The drive shaft 314 may have a polygonal shaped cross-section. For example, the drive shaft 314 may have a hexagonal shaped cross-section.

The example drive assembly 300 may be operatively coupled to the roller tube (e.g., the roller tube 114), such that rotation of the drive assembly 300 causes the roller tube to rotate and move a covering material of the motorized window treatment (e.g., the covering material 122 of the motorized roller shade 100) between a first position (e.g., an open position, such as a fully-open position) and a second position (e.g., a closed position, such as a fully-closed position). The couplings 350a, 350b may be coupled to the roller tube of the motorized window treatment. Each coupling 350a, 350b may include one or more compliant members 354, 356. The one or more compliant members 354, 356 may be configured to engage a smooth inner surface of the roller tube. For example, the one or more compliant members 354, 356 may extend beyond the outer surface 355 of the body 357 of the coupling. The one or more compliant members 354, 356 may protrude from the outer surface 355 along a direction that is not perpendicular to the outer surface 355. Stated differently, the one or more compliant members 354, 356 may protrude outward from the outer surface 355 at oblique angles. For example, the one or more compliant members 354, 356 may protrude, inwardly toward each other, from the outer surface 355. The oblique angles may be supplementary. The one or more compliant members 354, 356 may be configured to abut the inner surface of the roller tube. The one or more compliant members 354, 356 may apply a compressive force to the inner surface of the roller tube such that friction prevents rotation of the couplings 350a, 350b relative to the roller tube. Stated differently, the compliant members 354, 356 may be configured such that the roller tube and the couplings 350a, 350b rotate together. For example, the engagement of the compliant members 354, 356 may functionally create a rigid connection between the couplings 350a, 350b and the roller tube without the use of fasteners. A compliant member (e.g., such as the compliant members 354, 356) may be a flexible member that is configured to deflect when engaged with the inner surface of a roller tube. A tip of the compliant member may deflect with respect to a flexural pivot point.

FIGS. 4A-4D depict an example coupling assembly 400 (e.g., such as the example coupling 250 and/or the example couplings 350a, 350b as shown in FIGS. 2 and 3, respectively). The example coupling assembly 400 may be used with a roller tube of a motorized window treatment. For example, the coupling assembly 400 may be configured to be received within the roller tube (e.g., such as the roller tube 112 shown in FIGS. 1A-1C) of the motorized window treatment (e.g., such as the example window treatment shown in FIGS. 1A-1C).

Figure 4A:
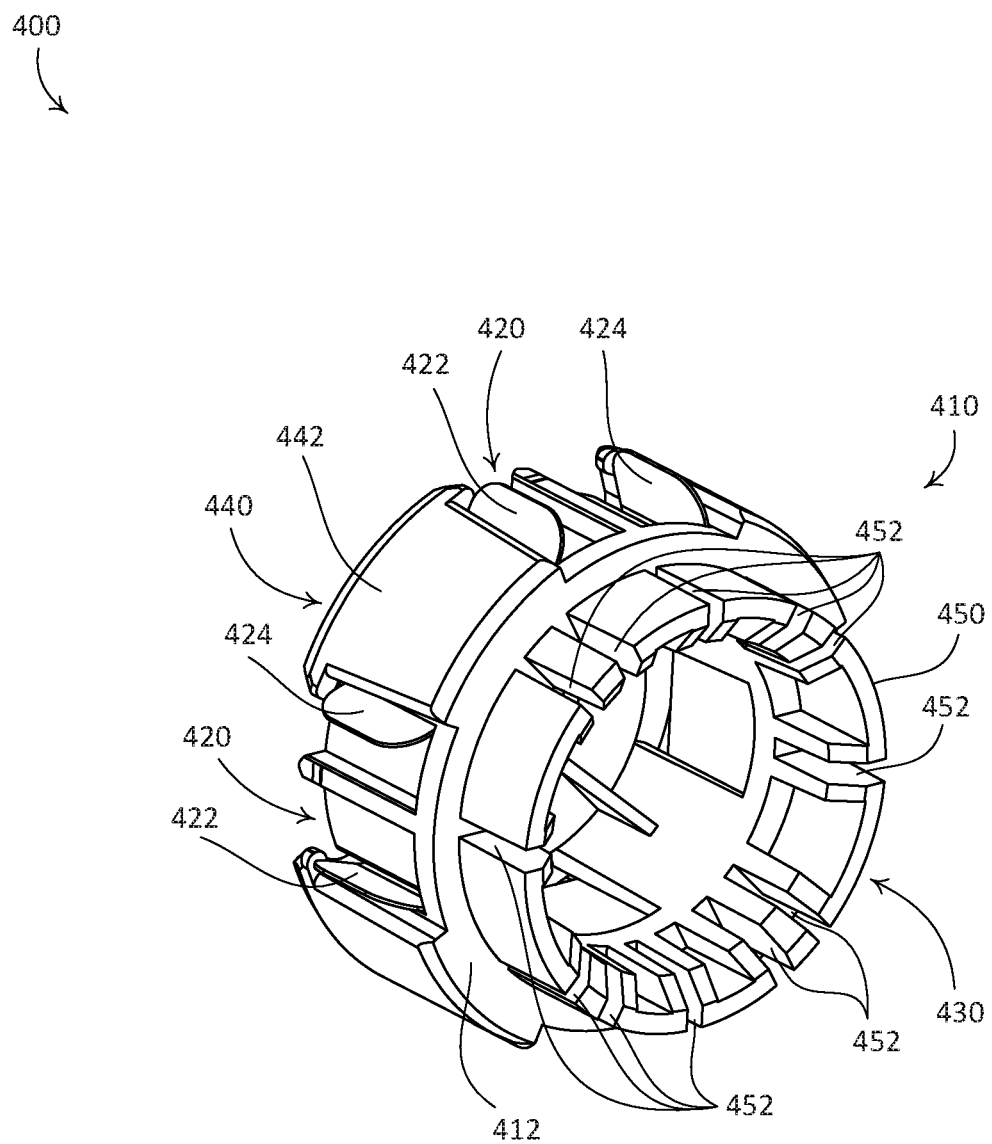
FIGS. 4A and 4B are perspective views of an example coupling assembly.
Figure 4B:
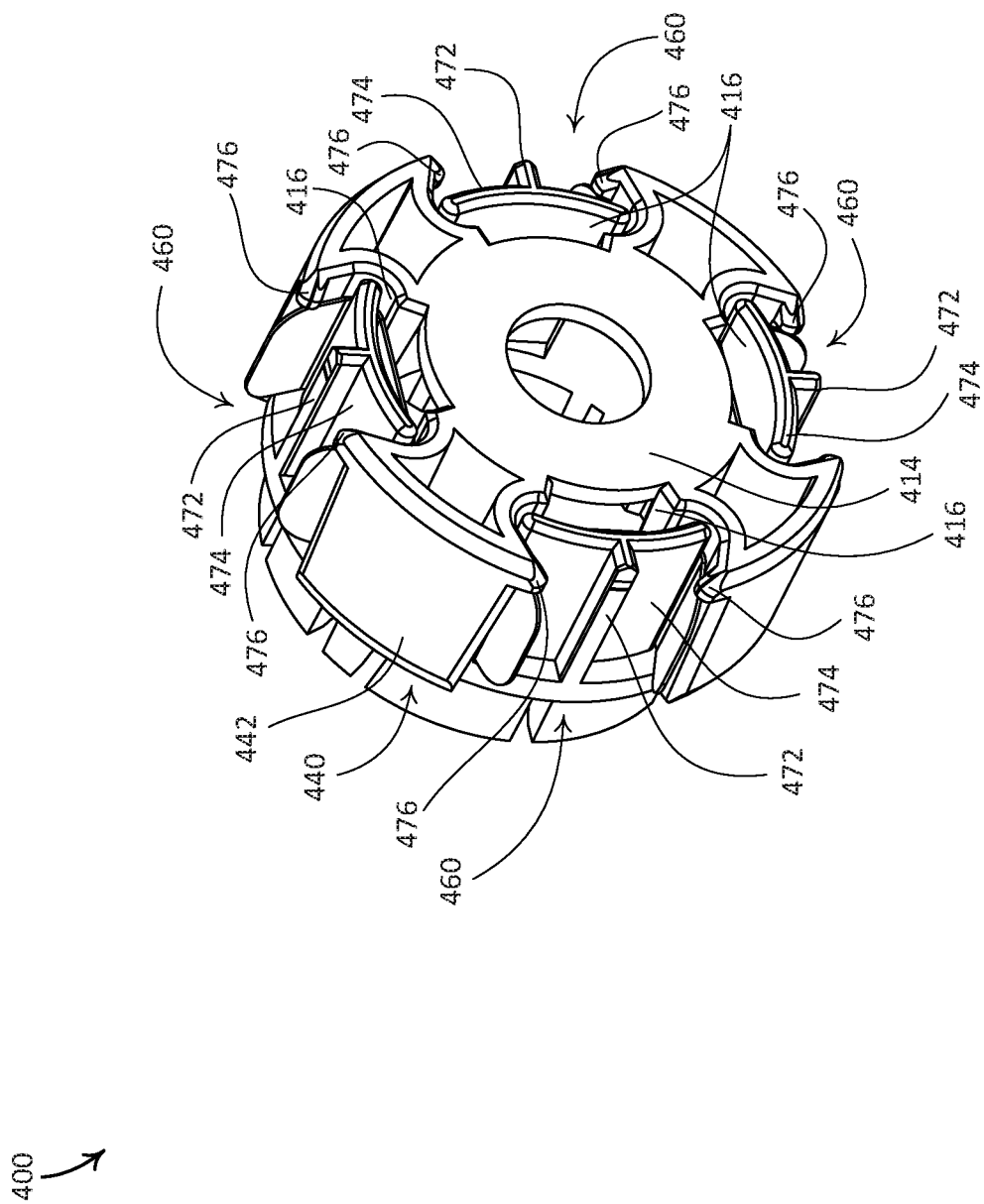
Figure 4C:
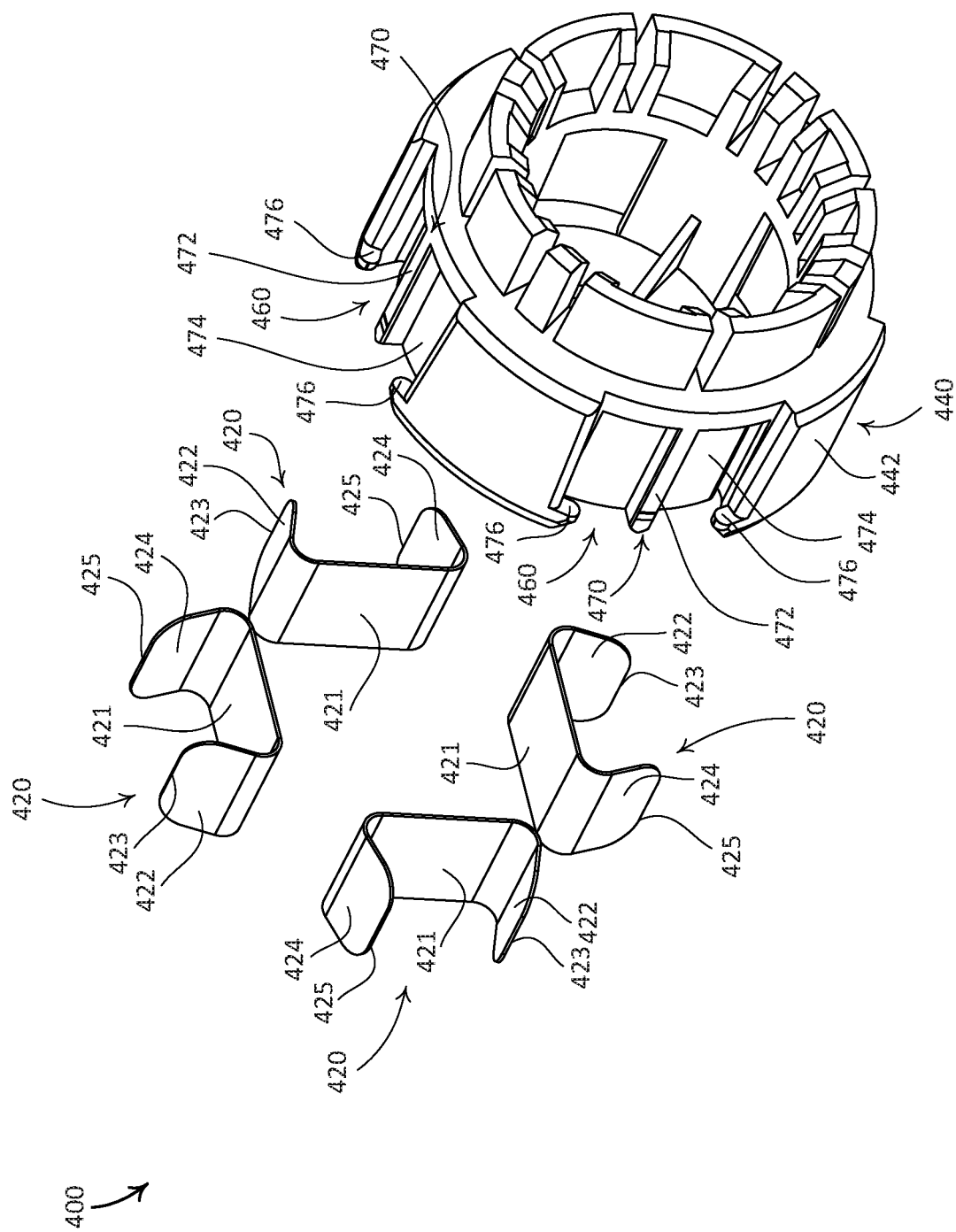
FIGS. 4C and 4D are exploded views of the example coupling assembly depicted in FIGS. 4A and 4B.
Figure 4D:
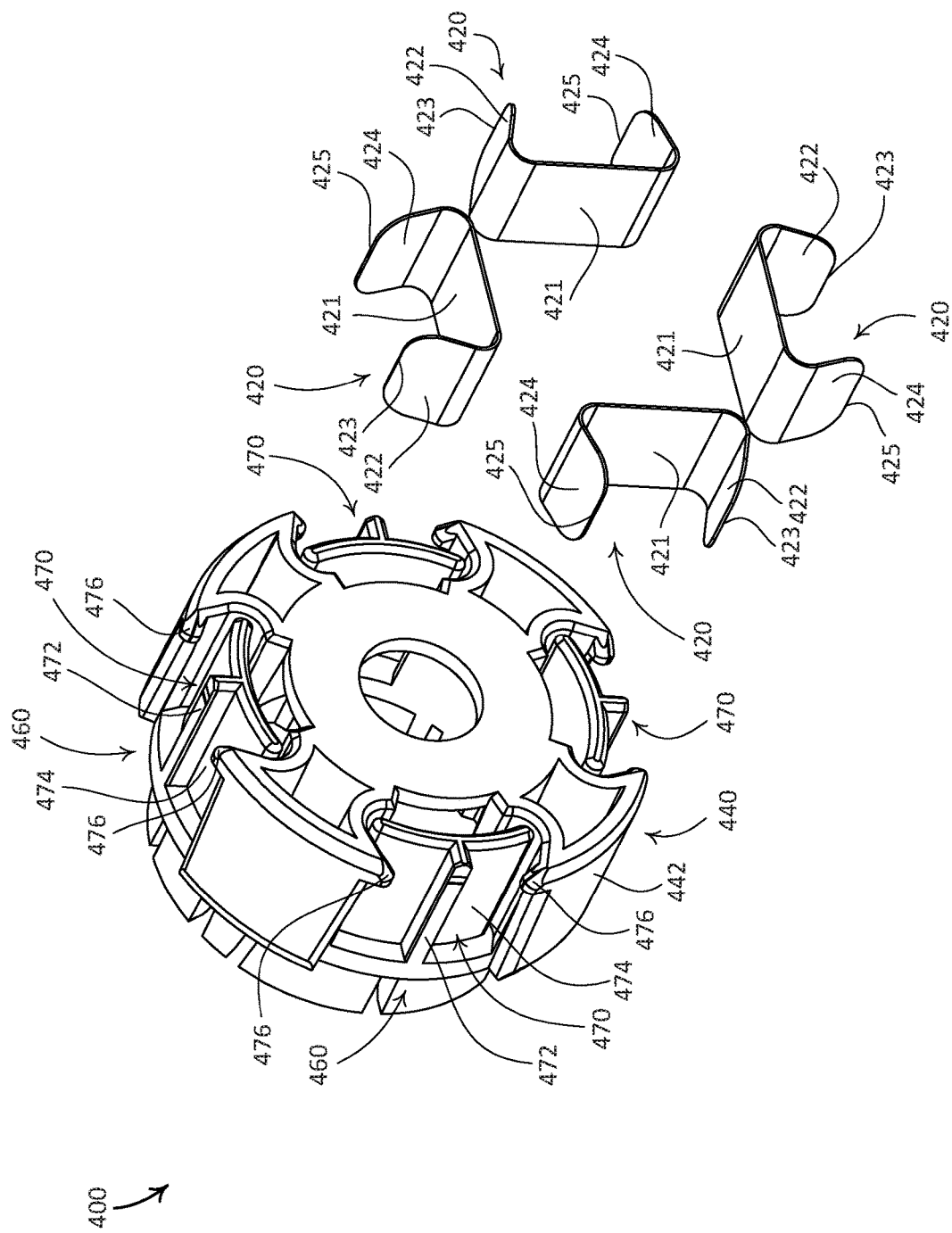

FIG. 4A is a front perspective view and FIG. 4B is a rear perspective view of the example coupling assembly 400. FIG. 4C is a front exploded view and FIG. 4D is a rear exploded view of the example coupling assembly 400. The example coupling assembly 400 may include a body 410 and a plurality of spring clips 420 (e.g., four spring clips as shown in FIG. 4C). The body 410 may define any suitable shape, such as the illustrated cylindrical body 410. The body 410 may define an outer flange 440. The outer flange 440 may define an outer surface 442. As shown, the plurality of spring clips 420 may be evenly spaced around the circumference of the outer flange 440 of the body 410. The example coupling assembly 400 is not limited to the illustrated number and/or orientation of the plurality of spring clips 420. For example, the example coupling assembly 400 may include any suitable number of the plurality of spring clips 420 which may be arranged at various locations around the circumference of the outer flange 440. Each of the plurality of spring clips 420 may include one or more compliant members 422, 424.

The body 410 may be configured to operatively engage with a drive assembly (e.g., such as the example drive assembly 200 and/or the example drive assembly 300 shown in FIGS. 2 and 3, respectively) of the motorized window treatment. The body 410 may define a bore 430 that extends therethrough along a rotational axis AR of the example coupling assembly 400. The bore 430 may be configured to accept a shaft (e.g., such as the drive shaft shown in FIGS. 2 and 3, respectively) of the drive assembly. The body 410 may be made from any material. For example, the body 410 may be metal, plastic, and/or a composite material.

The outer flange 440 may extend around an outer perimeter of the body 410. The outer flange 440 may be configured to be received within a roller tube of a motorized window treatment. The body 410 may include a ring 450. The ring 450 may protrude from a front surface 412 of the body 410. The ring 450 may protrude along the axis of rotation AR. The front surface 412 of the body 410 may be perpendicular to the axis of rotation AR. The ring 450 may include a plurality of notches 452. The plurality of notches 452 may comprise voids in the ring 450 that are configured to engage the coupling assembly 400 with one or more components of the motorized window treatment. For example, the plurality of notches 452 may be configured to accept a plurality of splines of an idler (e.g., such as the idler 320 shown in FIG. 3) and/or a drive hub (e.g., such as the drive hub 330 shown in FIG. 3).

The plurality of spring clips 420 may be removably attached to the body 410. For example, the plurality of spring clips 420 may be received by the outer flange 440 of the body 410. The plurality of spring clips 420 may be attached to the outer flange 440 such that they may be removed. Each of the plurality of spring clips 420 may be made from any material. For example, each of the plurality of spring clips 420 may be metal, plastic, and/or a composite material. Each of the plurality of spring clips 420 may be u-shaped. For example, each of the plurality of spring clips 420 may include a base 421 and one or more compliant members (e.g., engagement members) that extend from the base 421. For example, each spring clip 420 may include a first compliant member 422 and a second compliant member 424. The first compliant member 422 and the second compliant member 424 may extend from the base 421 inwardly at opposing oblique angles. Stated differently, the first and second compliant members 422, 424 of each spring clip 420 may extend toward each other with increasing distance from the base 421. For example, the opposing oblique angles may be supplementary. When a spring clip 420 is removably attached to the outer flange 440 of the body 410, the first compliant member 422 and the second compliant member 424 may be cantilevered from the outer flange 440 of the body 410. The plurality of spring clips 420 is not limited to the illustrated geometry and the spring clips 420 may define any suitable shape with any suitable number of compliant members. Although the drawings illustrate separate, attachable spring clips 420, the compliant members may be integral with the body (e.g., a monolithic coupling assembly).

The outer flange 440 of the body 410 may define one or more cavities 460. The one or more cavities may be evenly spaced around the circumference of the outer flange 440. Each of the one or more cavities 460 may be configured to receive a spring clip 420. The outer flange 440 may define a spring clip retainer 470 at each of the one or more cavities 460. The spring clip retainer 470 may include an arm 472 and a curved plate 474. The curved plate 474 may be cantilevered within the cavity 460. The arm 472 may structurally support the curved plate 474 within the cavity 460. The arm 472 may be attached to the curved plate 474. The spring clip retainer 470 may be configured to retain a spring clip 420 within the cavity 460. For example, the distal ends of the curved plate 474 may abut the compliant members 422, 424 of the spring clip 420. As another example, the distal ends of the curved plate 474 may engage the base 421 of the spring clip 420. As another example, the distal ends of the curved plate 474 may engage the base 421 and the compliant members 422, 424 of the spring clip 420. The outer flange 440 may define a plurality of retaining tabs 476. The plurality of retaining tabs 476 may extend into the plurality of cavities 460 at a rear surface 414 of the body 410. For example, each of the plurality of cavities 460 may include two retaining tabs 476. Each of the plurality of retaining tabs 476 may be configured to engage the first compliant member 422 or the second compliant member 424 of one of the spring clips 420 to prevent removal of the spring clip 420. The first compliant member 422 and the second compliant member 424 may be configure to be bent inward to allow installation of the spring clip 420 within the cavity 460.

The outer flange 440 may include a plurality of slots 416. Each of the plurality of slots 416 may be defined in, and thus correspond to, a respective cavity 460 of the plurality of cavities. Each of the plurality of slots 416 may be configured to accept a spring clip 420 (e.g., a component with one or more compliant members). For example, each of the plurality of slots 416 may be defined by one of the curved plates 474 and the rear surface 414 of the example coupling assembly 400. The slot 416 may accept the base 421 and/or one or more of the compliant members 422, 424 of one of the spring clips 420. For example, the slot 416 may be defined such that the curved plates 474 engage the spring clips 420 at or near the flexural pivot(s) of the compliant members 422, 424. For example, the slot 466 may be open on the rear surface 414 of the coupling assembly 400 and closed on the front side of the body 410 of the example coupling assembly 400 such that the spring clip 420 can be installed via the rear surface 414 of the body 410 of the example coupling assembly 400.

The first compliant member 422 of the example coupling assembly 400 may include a first tip 423. The second compliant member 424 of the example coupling assembly 400 may include a second tip 425. The first tip 423 and the second tip 425 may be outer edges of the first compliant member 422 and the second compliant member 424, respectively. For example, the first tip 423 may be defined by the distal end of the first compliant member 422 and the second tip 425 may be defined by the distal end of the second compliant member 424. The first tip 423 and the second tip 425 may be configured to engage an inner surface of the roller tube. For example, the first and second tips 423, 425 may be configured to bite into a smooth inner surface of a roller tube manufactured from carbon fiber. The first tip 423 and the second tip 425 may engage the inner surface of the roller tube such that the radial position of the coupling assembly 400 is fixed relative to the roller tube as the roller tube rotates. For example, the first tip 423 of the first compliant member 422 may be configured to abut and apply a compressive force to the inner surface of the roller tube. Abutment of the first tip 423 to the inner surface of the roller tube may prevent clockwise rotation of the coupling assembly 400 relative to the roller tube. The second tip 425 of the second compliant member 424 may be configured to abut and apply a compressive force to the inner surface of the roller tube. Abutment of the second tip 425 to the inner surface of the roller tube may prevent counter-clockwise rotation of the coupling assembly 400 relative to the roller tube. Stated differently, the first and second tips 423, 425 may be configured such that the roller tube and the coupling assembly 400 rotate together. For example, the engagement of the first and second tips 423, 425 of compliant members 422, 424 may functionally create a rigid connection between the coupling assembly 400 and the roller tube without the use of fasteners. A compliant member (e.g., such as the compliant members 422, 424) may be a flexible member that is configured to deflect when engaged with the inner surface of a roller tube. For example, a tip (e.g., such as the first and second tips 423, 425) of the compliant member may deflect, while a flexural pivot of the compliant member remains fixed. The tip may be a distal end of the compliant member. The intersection of the base 421 and the compliant member may define the flexural pivot. Each spring clip 420 may include two flexural pivots at the intersection of each compliant member 422, 424 and the base 421.

Figure 5C:
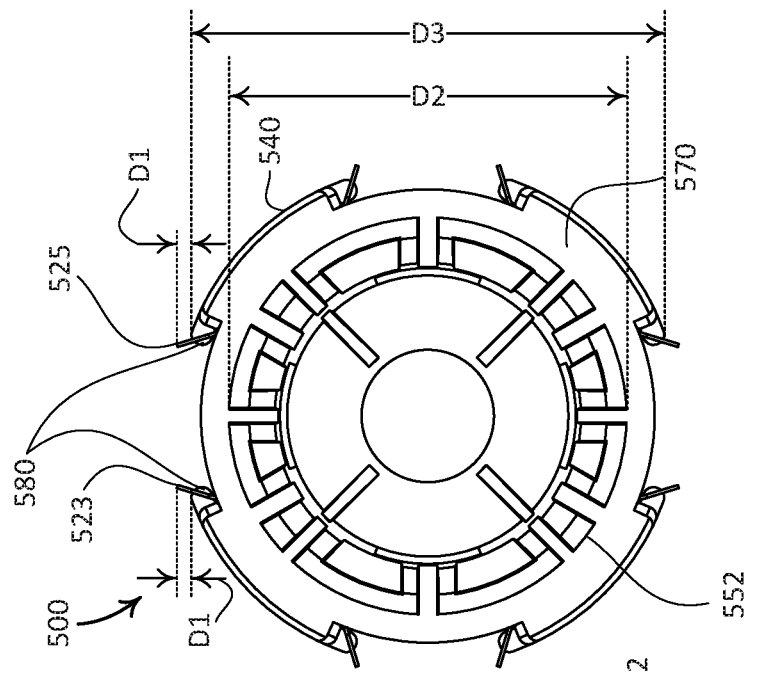
FIGS. 5A-5C depict projection views of an example coupling assembly.
Figure 5B:
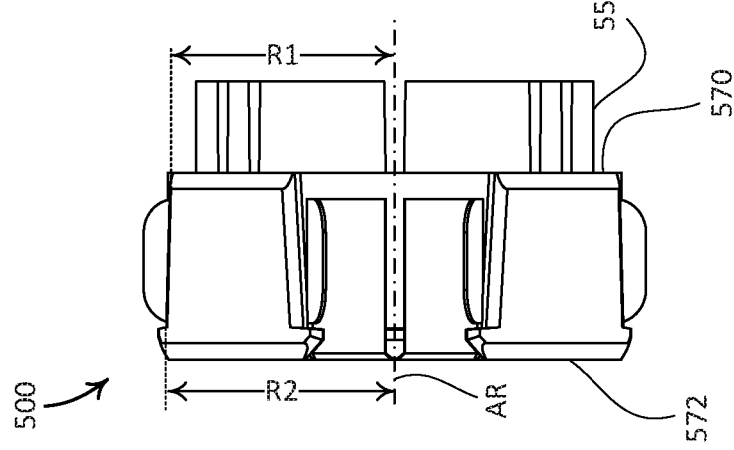
Figure 5A:
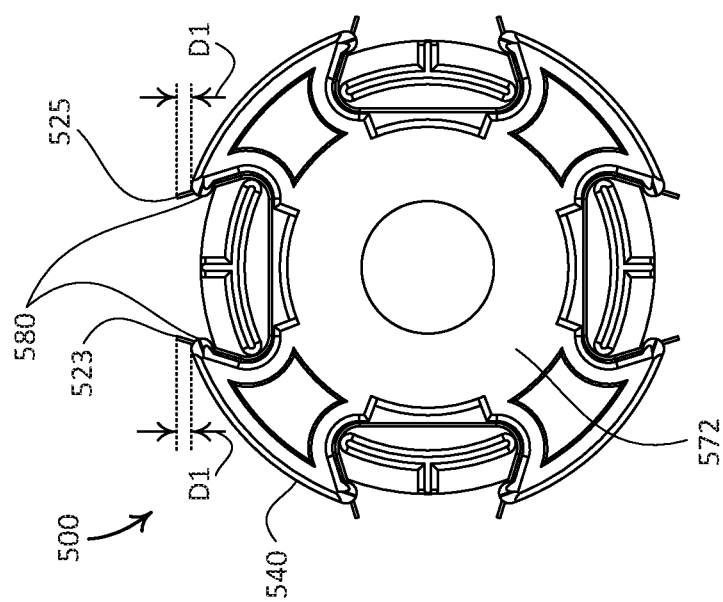

FIGS. 5A-5C are first angle projection views of an example coupling assembly 500 (e.g., such as the example coupling assembly 400 shown in FIGS. 4A and 4B). The example coupling assembly 500 may include a body 510 (e.g., such as the body 410 shown in FIGS. 4A-4D). The body 510 may define any suitable shape, such as the illustrated cylindrical body 510. The body 510 may be referred to as a body. The example coupling assembly 500 may include a plurality of spring clips 520 (e.g., such as the plurality of spring clips 420 shown in FIGS. 4A-4D). The plurality of spring clips 520 may be removably attached to an outer flange 540 (e.g., outer surface) of the body 510. For example the outer flange 540 may receive the spring clips 520. The outer flange 540 of the body 510 may include a plurality of cavities 560. The plurality of cavities 560 may be evenly spaced around the circumference of the outer flange 540. Each of the plurality of cavities 560 may be configured to receive a spring clip 520. The outer flange 540 may define a plurality of protrusions 580 (e.g., such as the plurality of retaining tabs 476 shown in FIG. 4). Each of the plurality of protrusions 580 may extend into a respective cavity of the plurality of cavities 550. The plurality of protrusions 580 may be configured to retain the plurality of spring clips 520 within the body 510. For example, a cavity 550 may include two protrusions 580 where the outer flange 540 meets the cavity 550.

Each of the plurality of spring clips 520 may comprise a base 521, a first compliant member 522, and a second compliant member 524. The first compliant member 522 and the second compliant member 524 may extend inwardly from the base 521 at opposing oblique angles. The first compliant member 522 and the second compliant member 524 may extend (e.g., at opposing oblique angles) beyond the outer flange 540 of the example coupling assembly 500. The opposing oblique angles may be supplementary. For example, the first compliant member 522 and the second compliant member 524 may be cantilevered from the outer flange 540. The first compliant member 522 may include a first tip 523 which is defined by the distal end of the first compliant member 522. The second compliant member 523 may include a second tip 525 which is defined by the distal end of the second compliant member 524. The first tip 523 and the second tip 525 may extend beyond the outer flange by a distance D1. The distance D1 may be configured such that the first tip 523 and the second tip 525 engage a smooth inner surface of a roller tube (not shown). For example, the first tip 523 may be configured to abut and apply a compressive force to an inner surface of the roller tube such that clockwise rotation of the example coupling assembly 500 relative to the roller tube is prevented. The second tip 525 may be configured to abut and apply a compressive force to the inner surface of the roller tube such that counter-clockwise rotation of the example coupling assembly 500 relative to the roller tube is prevented. Stated differently, the first and second tips 523, 525 may be configured such that the roller tube and the example coupling assembly 500 rotate together.

The outer flange 540 may taper from a rear side 572 of the example coupling assembly 500 towards a front side 570 of the example coupling assembly 500. For example, the outer flange 540 of the example coupling assembly may have a first radius R1 at the rear side 572 of the example coupling assembly 500 and a second radius R2 at the front side 570 of the example coupling assembly 500. The first radius R1 and the second radius R2 may be measured from the axis of rotation AR. The first radius R1 may be greater than the second radius R2.

The example coupling assembly 500 may include a ring 552 with a plurality of notches. The ring 552 may extend from the front side 570 of the example coupling assembly 500. The ring 552 may have a smaller diameter than the outer flange 540. For example, the ring 552 may have a first outer diameter D2. The outer flange 540 may have a second outer diameter D3. The second outer diameter D3 may be greater than the first outer diameter D2. One or more drive assembly components may accept the ring 552 such that the one or more drive assembly components and the coupling assembly 550 are operatively coupled.

It should be appreciated that the example motorized roller shade 100 illustrated and described herein is not limited to use as a window treatment, and that the motorized roller shade 100 may be implemented for uses other than covering openings (e.g., windows). For instance, the example motorized roller shade 100 having a low-deflection carbon fiber roller tube may be alternatively configured to function as a motorized projection screens (e.g., by replacing the covering material with a projection screen material).

The invention claimed is:

1. A coupling assembly for a roller tube of a window treatment system, the coupling assembly comprising:
a body that defines a bore that extends therethrough along a rotational axis; and
at least one spring clip that is attached to the body, the spring clip including a base and two compliant members that extend from the base at respective angles, wherein each of the respective angles are oblique to an outer surface of the body,
wherein the body further defines an outer flange that extends around an outer perimeter of the body, the outer flange defining the outer surface coaxial to the bore that extends at least partially around an outer perimeter of the coupling assembly, the outer flange further defining at least one cavity, the at least one cavity configured to receive the base of the at least one spring clip such that the base is interior to the outer surface, and
wherein respective portions of the two compliant members extend beyond the outer surface of the outer flange of the body.

2. The coupling assembly of claim 1, wherein the body further defines a ring having a plurality of notches, wherein the ring extends from a first side of the body, and wherein the ring has a smaller diameter than that of the outer flange of the body such that the ring can be received by a drive assembly of the window treatment system.

3. The coupling assembly of claim 2, wherein the plurality of notches are configured to receive a plurality of splines of the drive assembly such that the coupling assembly is drivable by the drive assembly.

4. The coupling assembly of claim 1, wherein the at least one spring clip comprises a plurality of spring clips and wherein the outer flange comprises a plurality of cavities, each cavity configured to receive one of the plurality of spring clips.

5. The coupling assembly of claim 4, wherein the plurality of cavities and the plurality of spring clips are evenly spaced around a circumference of the outer flange.

6. The coupling assembly of claim 1, wherein a first side of the outer flange comprises at least one slot corresponding to the at least one cavity, wherein the at least one slot is configured to accept the base of the at least one spring clip.

7. The coupling assembly of claim 1, wherein a first tip of a first compliant member of the two compliant members is configured to abut and apply a compressive force to an inner surface of the roller tube such that clockwise rotation of the coupling assembly relative to the roller tube is prevented, and wherein a second tip of a second compliant member of the two compliant members is configured to abut and apply a compressive force to the inner surface of the roller tube such that counter-clockwise rotation of the coupling assembly relative to the roller tube is prevented.

8. The coupling assembly of claim 1, wherein the two compliant members are configured such that a rigid connection between the coupling assembly and the roller tube is enabled without fasteners.

9. A coupling assembly for a roller tube of a motorized window treatment, the coupling assembly comprising:
a body that is configured to operatively engage with a drive assembly of the motorized window treatment, the body defining a bore that extends therethrough along a rotational axis of the body, the bore configured to receive a shaft of the drive assembly, the body further defining an outer flange, the outer flange defining an outer surface that extends at least partially around an outer perimeter of the coupling assembly and is coaxial to the bore; and
a plurality of spring clips that are attached to the outer flange of the body, each of the plurality of spring clips comprising a base and two compliant members that extend from the base at respective angles, wherein each of the respective angles are oblique to the outer surface,
wherein the coupling assembly is configured to be received within the roller tube of the motorized window treatment,
wherein respective portions of the two compliant members extend beyond the outer surface of the outer flange of the body, and
wherein the plurality of spring clips are configured to engage an inner surface of the roller tube such that a radial position of the coupling assembly is fixed relative to the roller tube as the roller tube rotates.

10. The coupling assembly of claim 9, wherein each of the plurality of spring clips are u-shaped;
wherein the outer flange defines a plurality of cavities, each cavity configured to receive one of the plurality of spring clips; and
wherein a first side of the outer flange comprises a plurality of slots corresponding to the plurality of cavities, each slot configured to accept the base of one of the plurality of spring clips such that the base is interior to the outer flange.

11. A motorized window treatment comprising:
- a roller tube;
- a drive assembly that is at least partially received in the roller tube;
- a covering material that is attached to the roller tube, the covering material operable between a raised position and a lowered position via rotation of the roller tube by drive assembly; and
- a coupling assembly that is received within the roller tube, the coupling assembly operatively engaged to the drive assembly, and the coupling assembly comprising a body and a plurality of spring clips that are attached to the body, each of the plurality of spring clips comprising first and second compliant members that extend from the body at different respective angles, each of the respective angles being oblique to a surface of the body, the first and second compliant members of the plurality of spring clips compressively engaging an inner surface of the roller tube such that the coupling assembly is fixed relative to the roller tube as the roller tube rotates.

12. The motorized window treatment of claim 11, wherein the first compliant member and the second compliant member are connected by a base, the first and second compliant members extending from the base at opposing angles.

13. The motorized window treatment of claim 12, wherein the body defines an outer flange having at least one cavity, and wherein the first compliant member and the second compliant member are received by the at least one cavity.

14. The motorized window treatment of claim 13, wherein a first side of the outer flange comprises a slot corresponding to the at least one cavity, wherein the slot is configured to accept the base such that the base is interior to the outer surface.

15. The motorized window treatment of claim 13, wherein respective portions of the first and second compliant members are cantilevered from the outer flange of the body.

16. The motorized window treatment of claim 13, wherein the coupling assembly comprises a plurality of first compliant members and a plurality of second compliant members that are evenly spaced around a circumference of the outer flange of the body.

17. The motorized window treatment of claim 11, wherein a first tip of the first compliant member abuts and applies a compressive force to the inner surface of the roller tube such that friction prevents clockwise rotation of the coupling assembly relative to the roller tube, and wherein a second tip of the second compliant member abuts and applies a compressive force to the inner surface of the roller tube such that friction prevents counter-clockwise rotation of the coupling assembly relative to the roller tube.

18. The motorized window treatment of claim 11, wherein the body includes a ring that defines a plurality of notches, wherein the ring extends from a first side of the body, and wherein the ring has a smaller diameter than that of the outer surface of the body such that the ring is received by a drive hub of the drive assembly, the plurality of notches receiving a plurality of splines of the drive hub such that the coupling assembly is drivable by the drive assembly.

19. The motorized window treatment of claim 11, wherein the body defines a bore that extends therethrough along a rotational axis, the bore accepting a shaft of the drive assembly.

20. The motorized window treatment of claim 11, wherein the roller tube is manufactured of carbon fiber.

21. The motorized window treatment of claim 11, wherein the coupling assembly is a first coupling assembly, the motorized window treatment further comprising:
- a second coupling assembly that is received within the roller tube.

22. The motorized window treatment of claim 11, wherein the first compliant member and the second compliant member are configured such that a rigid connection between the coupling assembly and the roller tube is enabled without fasteners.

23. The motorized window treatment of claim 11, wherein the body of the coupling assembly is configured to be removably attached to a drive hub of the drive assembly.

24. The motorized window treatment of claim 11, wherein the drive assembly comprises a motor drive unit for driving the body of the coupling assembly.

* * * * *